(No Model.)

J. H. E. DE CELLES.
OCULIST'S TESTING FRAME.

No. 528,717.  Patented Nov. 6, 1894.

Witnesses
Chas. F. Schmelz
Katie Farrell

Inventor
Joseph H. E. De Celles,
By Attorney
John C. Dewey

UNITED STATES PATENT OFFICE.

JOSEPH H. E. DE CELLES, OF SOUTHBRIDGE, MASSACHUSETTS, ASSIGNOR TO THE AMERICAN OPTICAL COMPANY, OF SAME PLACE.

OCULIST'S TESTING-FRAME.

SPECIFICATION forming part of Letters Patent No. 528,717, dated November 6, 1894.

Application filed January 3, 1894. Serial No. 495,513. (No model.)

*To all whom it may concern:*

Be it known that I, JOSEPH H. E. DE CELLES, a citizen of the United States, residing at Southbridge, in the county of Worcester and State of Massachusetts, have invented certain new and useful Improvements in Oculists' Testing-Frames; and I do hereby declare that the following is a full, clear, and exact description thereof, which, in connection with the drawings making a part of this specification, will enable others skilled in the art to which my invention belongs to make and use the same.

My invention relates to a testing or trial frame used by oculists in testing eyes, preparatory to fitting spectacles or eyeglasses thereto.

The object of my invention is to improve upon the construction of oculists' testing frames, as now ordinarily made, and more particularly to strengthen and make more rigid the main bar of the frame, and the supports of the lens holding frames, so as to prevent any yielding or bending of said bar, and lens holding frames, and any displacement thereof from their true position, relative to each other.

My invention consists in certain novel features of construction of an oculist's testing frame, as will be hereinafter fully described.

Figure 1:
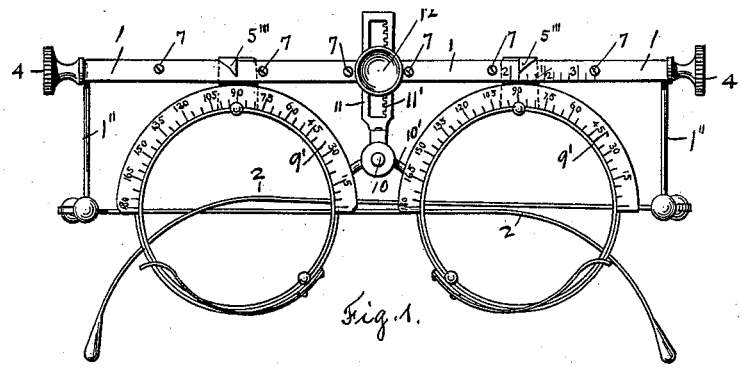
Figure 2:
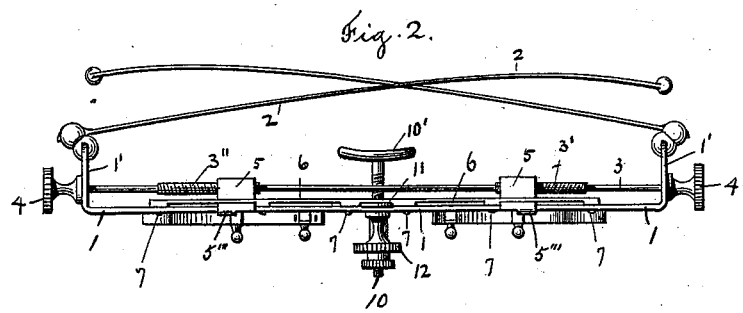
Figure 3:
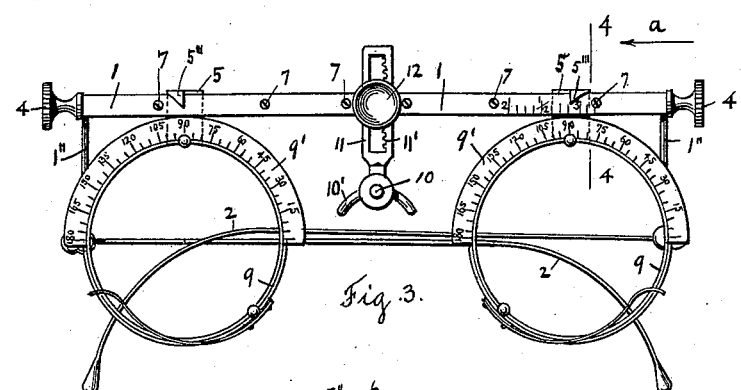
Figure 4:
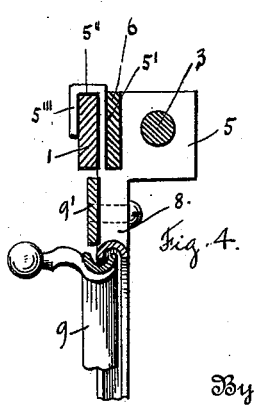

Referring to the drawings:—Figure 1 is a front view of a testing frame, embodying my improvements, with the lens holding frames moved toward each other. Fig. 2 is a plan view of the frame shown in Fig. 1. Fig. 3 corresponds to Fig. 1, but shows the lens holding frames moved away from each other. Fig. 4 is, on an enlarged scale, a cross section on line 4, 4, Fig. 3, looking in the direction of arrow *a*, same figure.

In the accompanying drawings, the frame consists of the main bar 1, on which the several parts are supported. Said bar is made flat and has its ends, which are preferably made round, bent rearwardly and downwardly to form extending arms 1'', to the lower ends of which are jointed the temples or bows 2. The adjusting rod 3 extends at each end through a hole in the rearward extensions 1' of the bar 1, and has a knob 4 on each end thereof, to turn said rod in one direction or the other. The rod 3 is provided with a left-hand threaded portion 3', and a right-hand threaded portion 3'' in the usual way, and upon each threaded portion is mounted a nut 5, provided with a corresponding left-hand, and right-hand thread. The front portion of each nut 5 is provided with a vertical slot 5' extending down from the top surface, as shown in Fig. 4, and in said slot 5' extends loosely a flat auxiliary bar 6, parallel to the main bar 1, and located at the rear thereof, and secured thereto by screws 7. The front side of each nut 5 is provided with a recess 5'', through which extends loosely the main bar 1, and the lip 5''', forming the front of the recess 5', serves as an index point for the scale on the front of the bar 1. See Figs. 1 and 3. On the downwardly extending portion 8 of each nut 5, is supported a lens holding frame 9, which may be of the ordinary construction, and provided with the flanges 9', having the usual graduations thereon.

The vertical slot 5' and the recess 5'' in the nuts 5, form sliding bearings, engaging the auxiliary bar 6, and the bar 1, on which bars said nuts, carrying the lens holding frames 9, slide as they are moved toward and away from each other, by turning the rod 3.

The nose piece consists of the horizontal rod 10, with the forked end 10' supported in the lower end of the vertical adjustable bar 11, mounted between the bars 1 and 6, and having a vertical motion by a pinion not shown, engaging a rack 11', on the vertical moving bar 11, said pinion fast on the spindle of a knob 12.

By combining with the flat main bar 1, the flat auxiliary bar 6, located at, and secured to the rear of the main bar, and extending parallel thereto, I strengthen the frame, and prevent its bending or twisting, and by the construction of the nuts 5, and the manner of attaching them to the auxiliary bar 6, and the main bar 1, to slide thereon, I provide a strong and secure support for the lens holding frames, and at the same time I provide an index point for the scale at the front of the main bar, to register the pupilary distance of the lenses. The vertical moving bar 11 of the adjustable nose piece is firmly supported, and moved up and down between the main bar 1, and the auxiliary bar 6.

To ascertain the pupil distance of the lenses, the lens holding frames are moved toward and away from each other, by turning the rod 3, in one direction or in the other, by means of the knobs 4 thereon, in the usual way.

It will be understood that the details of construction of some of the parts of the testing frame shown in the drawings, may be varied if desired.

Having thus described my invention, what I claim as new, and desire to secure by Letters Patent, is—

1. An oculist's testing frame, consisting of a flat bar having the ends thereof bent rearwardly and downwardly, and the temples jointed thereto, and an auxiliary bar extending at the rear of, and secured to the main bar, and a screw threaded adjusting rod supported loosely in the rearwardly extending arms of the main bar, in combination with two nuts, each nut supporting a lens holding frame, and mounted upon and having a threaded engagement with the adjusting rod, and having a vertical slot in which loosely extends the auxiliary bar, and also a recess in the front side thereof, in which recess extends the main bar of the frame, said slot and recess forming sliding bearings for the nut on the main and auxiliary bars of the frame, substantially as shown and described.

2. An oculist's testing frame, consisting of a flat bar with the ends thereof bent rearwardly and downwardly, and the temples jointed thereto, and an auxiliary bar extending at the rear of, and secured to the main bar, and a screw threaded adjusting rod supported loosely in the rearwardly extending arms of the main bar, in combination with two nuts, each nut supporting a lens holding frame, and mounted upon and having a threaded engagement with the adjusting rod, and having a vertical slot therein, in which loosely extends the auxiliary bar, and also a recess in the front side thereof, in which recess extends the main bar of the frame, said slot and recess forming sliding bearings for the nut on the main and auxiliary bars of the frame, and an adjustable nose piece, consisting of a horizontal rod with a forked end, supported in the lower end of a vertical bar mounted between the main and auxiliary bars, said vertical bar provided with rack teeth and adapted to be adjusted vertically, substantially as shown and described.

JOSEPH H. E. DE CELLES.

Witnesses:
GEO. W. WELLS,
CHANNING M. WELLS.